United States Patent
Shapira et al.

(10) Patent No.: US 6,957,050 B2
(45) Date of Patent: Oct. 18, 2005

(54) TIME-DELAY TRANSMIT DIVERSITY ADD-ON TO A MULTICARRIER BASE TRANSCEIVER SYSTEM

(75) Inventors: Joseph Shapira, Haifa (IL); Shmuel Miller, Tal El (IL); Paul H. Lemson, Woodinville, WA (US)

(73) Assignee: Celletra Ltd., Yokneam (IL)

( * ) Notice: Subject to any disclaimer, the term of this patent is extended or adjusted under 35 U.S.C. 154(b) by 562 days.

(21) Appl. No.: 10/277,102

(22) Filed: Oct. 22, 2002

(65) Prior Publication Data

US 2003/0092403 A1 May 15, 2003

Related U.S. Application Data

(60) Provisional application No. 60/330,505, filed on Oct. 23, 2001.

(51) Int. Cl.[7] .............................. H04C 7/02; H04B 1/02; H04B 1/38
(52) U.S. Cl. .................. 455/101; 455/562.1; 375/267; 375/299
(58) Field of Search ........................... 455/69, 91, 101, 455/103, 561, 562.1; 375/267, 295, 299; 370/334

(56) References Cited

U.S. PATENT DOCUMENTS

| | | | | |
|---|---|---|---|---|
| 5,301,363 A | * | 4/1994 | Hinderks | 455/101 |
| 5,757,853 A | * | 5/1998 | Tsujimoto | 375/347 |
| 5,848,103 A | * | 12/1998 | Weerackody | 375/295 |
| 5,859,879 A | * | 1/1999 | Bolgiano et al. | 455/101 |
| 5,930,248 A | * | 7/1999 | Langlet et al. | 375/347 |
| 6,131,016 A | * | 10/2000 | Greenstein et al. | 455/562.1 |
| 6,731,619 B1 | * | 5/2004 | Ramesh et al. | 370/334 |

* cited by examiner

Primary Examiner—Quochien B. Vuong

(57) ABSTRACT

At least two passive antenna arrays of an existing multicarrier base station transceiver system are supplemented by an auxiliary antenna array to provide a system and method of enhancing reverse link sensitivity and reducing the effects of multipath fading in a wireless communication system without the need for modifications to the mobile station. The auxiliary antenna array provides a complementary transmit diversity path for the two passive antennas such that a predetermined time delay is implemented to a composite transmit signal and the delayed composite transmit signal is fed directly to the auxiliary antenna array. The delayed signal and the signals from the passive antenna arrays provide a reduced noise figure and time delay transmit diversity for the multicarrier BTS operation.

23 Claims, 5 Drawing Sheets

TIME-DELAY TRANSMIT DIVERSITY ADD-ON TO A MULTICARRIER BASE TRANSCEIVER SYSTEM

RELATED APPLICATION

This application is related to and claims priority from Provisional U.S. Application No. 60/330,505 filed Oct. 23, 2001.

BACKGROUND OF THE INVENTION

Reservation of Copyright

This patent document contains information subject to copyright protection. The copyright owner has no objection to the facsimile reproduction by anyone of the patent document or the patent, as it appears in the U.S. Patent and Trademark Office files or records, but otherwise reserves all copyright rights whatsoever.

BACKGROUND

The invention generally relates to the field of cellular communications. More specifically, the present invention relates to time-delay transmit diversity enhancement of the forward link of a cellular communications system.

Wireless communications systems generally employ a plurality of base stations (BSs) which communicate with mobile stations (MSs) within a cell. The BSs are dispersed across a geographic service area and include at least one antenna and a base station transceiver system (BTS) to provide wireless service within the cell. The BTSs are coupled to base station controllers (BSCs) which may serve a plurality of BTSs. The BSC may also be coupled to a mobile switching center (MSC), capable of interfacing to the Public Switched Telephone Network (PSTN) and other BSCs.

As a MS moves around, transmitted signals on associated wireless channels are influenced by time-varying phenomena. Well-known communications phenomena such as shadowing, fading, Doppler shifting, and polarization mismatches may affect the communications link performance between a MS and a corresponding BS.

Digital wireless systems, which employ Code Division Multiple Access (CDMA), for example, may implement diversity transmission techniques to alleviate the effects of fading on a communications link between MSs and BSs. With diversity transmission, multiple replicas of the transmitted information are received at the receiving end. Each of the multiple replicas has an independent level of fading. By employing various receiver detection schemes (e.g., rake receiver) and exploiting the independent levels of fading, it is possible to recover a significant amount of any lost bit error-rate (BER) performance and improve overall system performance.

There are several diversity techniques that may be utilized in wireless CDMA systems. Such techniques include delay diversity, space diversity and polarization diversity schemes. Delay diversity relies on the property of minimum correlation between replicas of a direct-sequence (DS) spread-spectrum signal, delayed with respect to each other by more than the chip duration. A rake receiver recovers the delayed replicas of the signal to enhance the effective SNR into the detector.

CDMA systems are interference-limited. The number of users that can use the same spectrum and still have acceptable performance is determined by the total interference power of all users. Thus, the number of users that may be supported by each BTS is limited. In an effort to increase the capacity of CDMA systems, additional BSs may be added to increase the number of cells within the service area. However, because user traffic loads are often concentrated within small geographic areas, even with the addition of BSs, there may still be some cells that remain overloaded while neighboring cells are under-loaded. To alleviate such overcrowding in CDMA systems, multiple carriers may be assigned within a single service area to service the overlaying cells. With overlaying frequency coverage, some MSs are serviced by using one of the carrier frequencies while other MSs are serviced by relying on other carrier frequencies.

Generally, for such multicarrier operations, the BTS generates two or more carriers, which are then simultaneously transmitted by the BS. BSs that support multicarrier operations typically use two passive antennas per sector for transmission. Of the two passive antennas, one antenna has transmit and receive capabilities, while the other has only receive capabilities. In doing so, such a configuration allows receive diversity. Multicarrier BSs are limited in their ability to mitigate other factors that compromise communications link performance between MSs and BSs.

SUMMARY

Systems and methods are presented to overcome some of the limitations indicated above. For example, systems and methods are provided that enhance reverse link sensitivity and reduce the effects of multipath fading in wireless systems by implementing transmit diversity to a multicarrier base station system (BS). Such features may be incorporated in an existing multicarrier CDMA mobile network without the need for modifications to the mobile station.

In one illustrative embodiment, a multicarrier base station transceiver system (BTS) employs a plurality of antennas per sector, for example, three antennas per sector. In such an implementation, a supplemental antenna array supplements the two passive antennas of typical multicarrier BTS operations. The supplemental antenna array provides a transmit diversity path for the two passive antennas such that signals transmitted from the multicarrier BTS are sampled, combined, delayed and fed directly to the supplemental antenna array. With this configuration, the delayed signal from the supplemental antenna array as well as the signals from the two passive antennas achieve a reduced noise figure and provide a time delay transmit diversity for the multicarrier BTS operation, which improves the overall quality of the forward and reverse links of the wireless communication system.

BRIEF DESCRIPTION OF THE DRAWINGS

The inventions presented and claimed herein are further described in the detailed description which follows, with reference to the drawings, and by way of a non-limiting exemplary embodiment of the present invention, wherein like reference numerals represent similar parts of the present invention throughout the several views and wherein:

DETAILED DESCRIPTION

Figure 1:
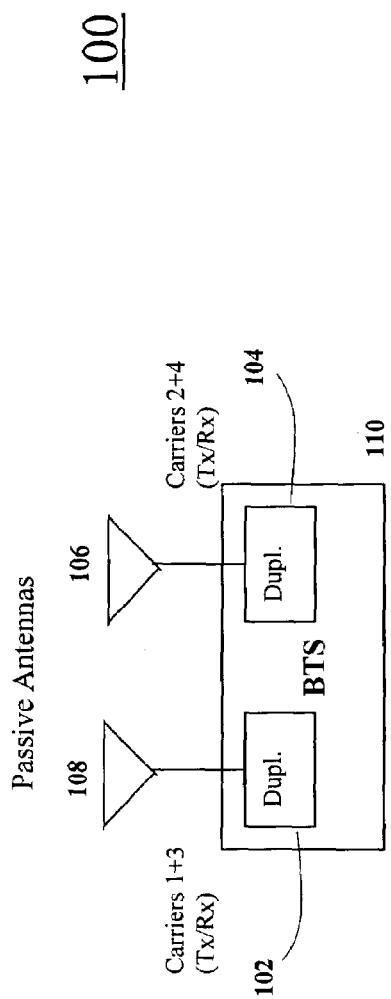
FIG. 1 is a schematic diagram of a portion of a multicarrier base station system 100.

FIG. 1 is a schematic diagram of a portion of a multicarrier base station system 100. BSs 100 equipped with BTSs 110 capable of multicarrier operations may utilize two passive antennas 106 and 108 to perform multicarrier transmissions as well as achieve reverse link or receive diversity. BS 100 may arrange passive antennas 106 and 108 to achieve receive (Rx) space diversity reception.

BTS 110 generates two or more carriers, which are then simultaneously transmitted from BS 100. The generated carriers are e.g., combined in two groups of non-adjacent carriers in accordance with a minimum-loss combining scheme. The groups of non-adjacent carriers are illustrated in FIG. 1 as Carriers 1+3 and Carriers 2+4. Each of the non-adjacent groups is forwarded via duplexers, 102 and 104, which enables simultaneous transmission and reception through each of the two passive antennas.

BS 100 lacks forward link or transmit delay diversity and, thus, does little to reduce fading effects on the forward link. Moreover, the reverse link component chain in BS 100 is susceptible to signal noise contributions inherent in such configurations.

As will be described in greater detail below, a BS supporting MC operations may be configured with a supplemental antenna and a delay mechanism to provide transmit delay diversity on the forward link via a 3-antenna configuration. This 3-antenna configuration may also exploit shared components to achieve greater reverse link sensitivity, resulting in e.g., reduced MS transmit power in some cells.

Figure 2A:
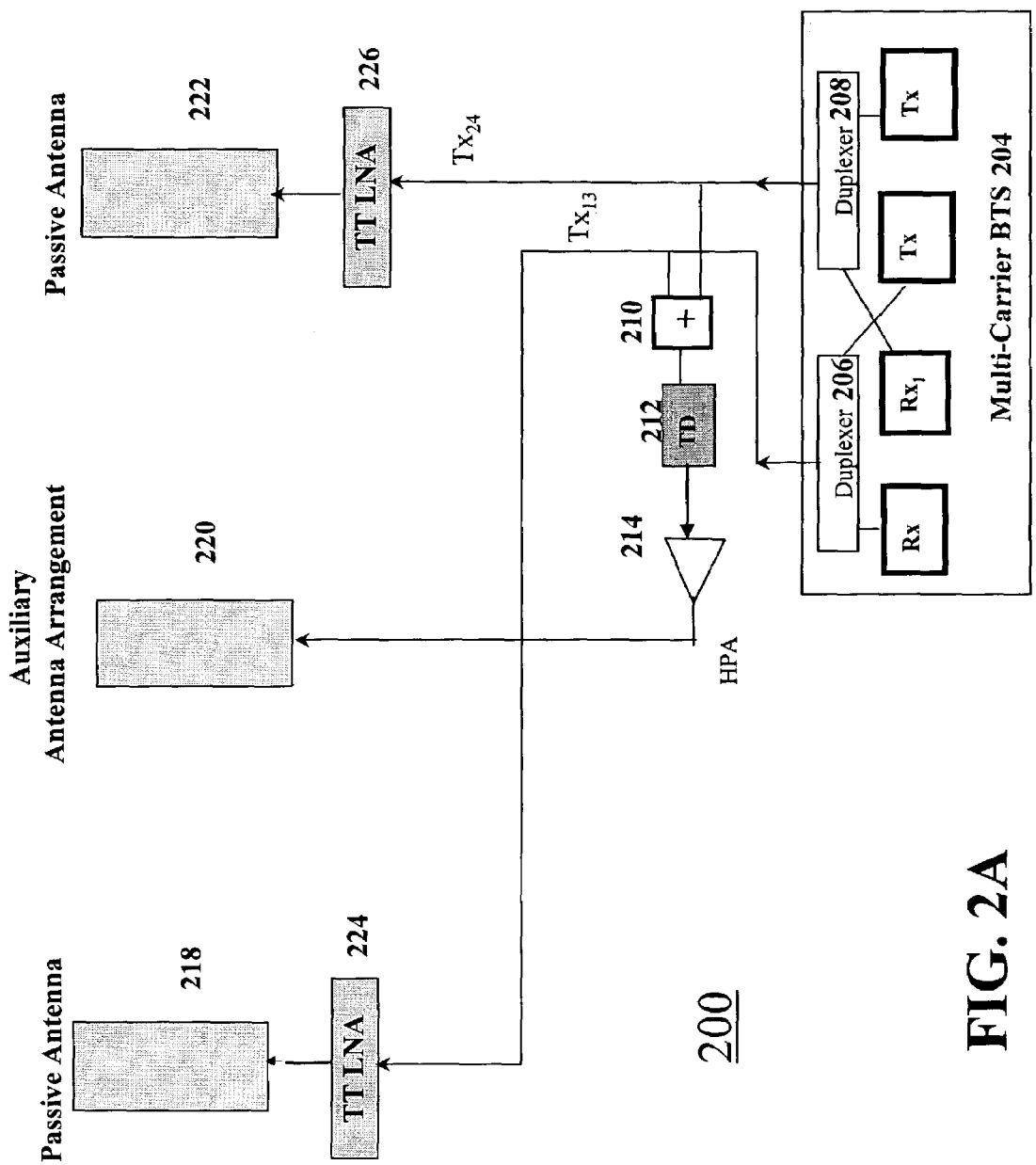
FIG. 2A is a schematic diagram of a portion of a base station 200 that supports multicarrier operation.

FIG. 2A is a schematic diagram of a portion of a multi carrier base station (MC BS) 200 that supports multicarrier operation in accordance with an embodiment of the inventions. BS 200 incorporates an auxiliary antenna arrangement 220 in addition to two conventional passive antennas 218, 222. Auxiliary antenna arrangement 220 may be configured as a passive antenna arrangement, but it could otherwise be configured. Thus, BS 200 may be implemented in an existing conventional MC BS system having two passive antennas 218, 222.

The auxiliary passive antenna array 220 may be positioned so as to employ space diversity with respect to each of the two passive antennas 218, 222. The distance between each of passive antennas 218, 222 and passive antenna 220 depends on the frequency of operation and can be determined using methods known in the art. For example, the distance required for space diversity for a large cell may be 10 wavelengths of the transmitted signal. Auxiliary passive antenna array 220 transmits a delayed signal version for all the channels and, thus, also provides transmit diversity for the two passive antennas 218, 222 and their respective channels.

During multicarrier operation of BS 200, carriers generated by BTS 204 are combined in the forward link or transmit direction. This may be achieved by combining, for example, carriers 1 and 3 into the transmit chain terminating with passive antenna 218, and combining carriers 2 and 4 into the transmit chain terminating with passive antenna 222. The transmit and receive signals of MC BTS 204 pass through duplexers 206, 208 which may be located internally within the MC BTS 204, but do not have to be so located.

Generally, transmit signals emanating from duplexers 206, 208 are relatively high-powered and are sampled and combined by a directional coupling and combining mechanism 210 to produce a composite transmit signal. The composite transmit signal is delayed a predetermined amount by TD unit 212 and then amplified by high power amplification device 214 to produce a delayed composite transmit signal.

It will be appreciated that a TT LNA may be used, for example, to enhance reverse link reception quality by improving the effective noise figure (NF) of the receive paths of passive antennas 218 and 222. As such, each of the passive antennas 218 and 222 used for receiving may be equipped with tower-top low-noise amplifiers (TT LNAs) 224 and 226 which may be commercial-off-the-shelf (COTS) items.

Figure 2B:
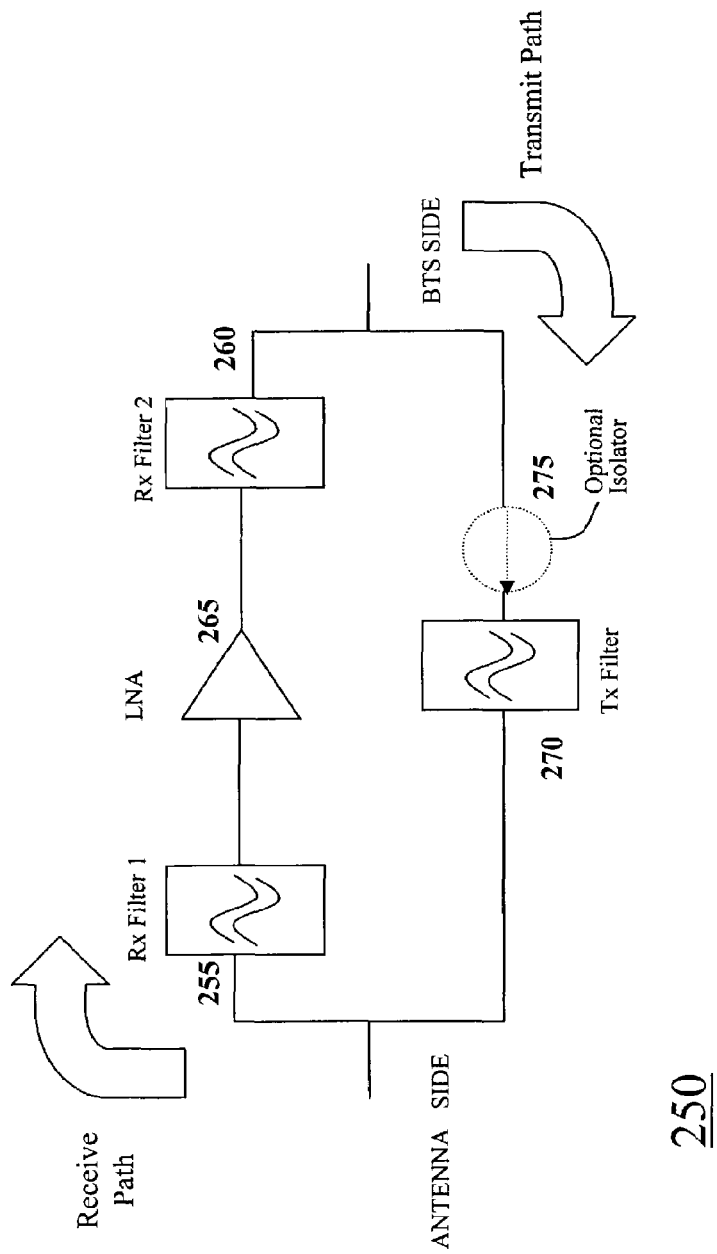
FIG. 2B is a functional block diagram of a tower-top low noise amplifier (TT LNA) configuration 250.

FIG. 2B illustrates a functional block diagram of TT LNA configuration 250 that may be used in the embodiment of FIG. 2A. As indicated in FIG. 2B, LNA 265 is isolated from the high-power transmit signal by filters 255, 260, while the transmit signal reaches the antenna unaffected by the LNA 265. Tx filter 270, typically a bandpass filter, provides a low loss path in the transmit direction. In situations when it is necessary to block reverse injected strong or nearby interference, the TT LNAs of the existing passive antennas 218 and 222 may equipped with an optional isolator 275.

Returning to FIG. 2A, high power amplifier 214 may be located next to the MC BTS 204, possibly as an indoor unit, or high power amplifier unit 214 may be placed at the tower base or tower top next to the TT LNA units.

Figure 3A:
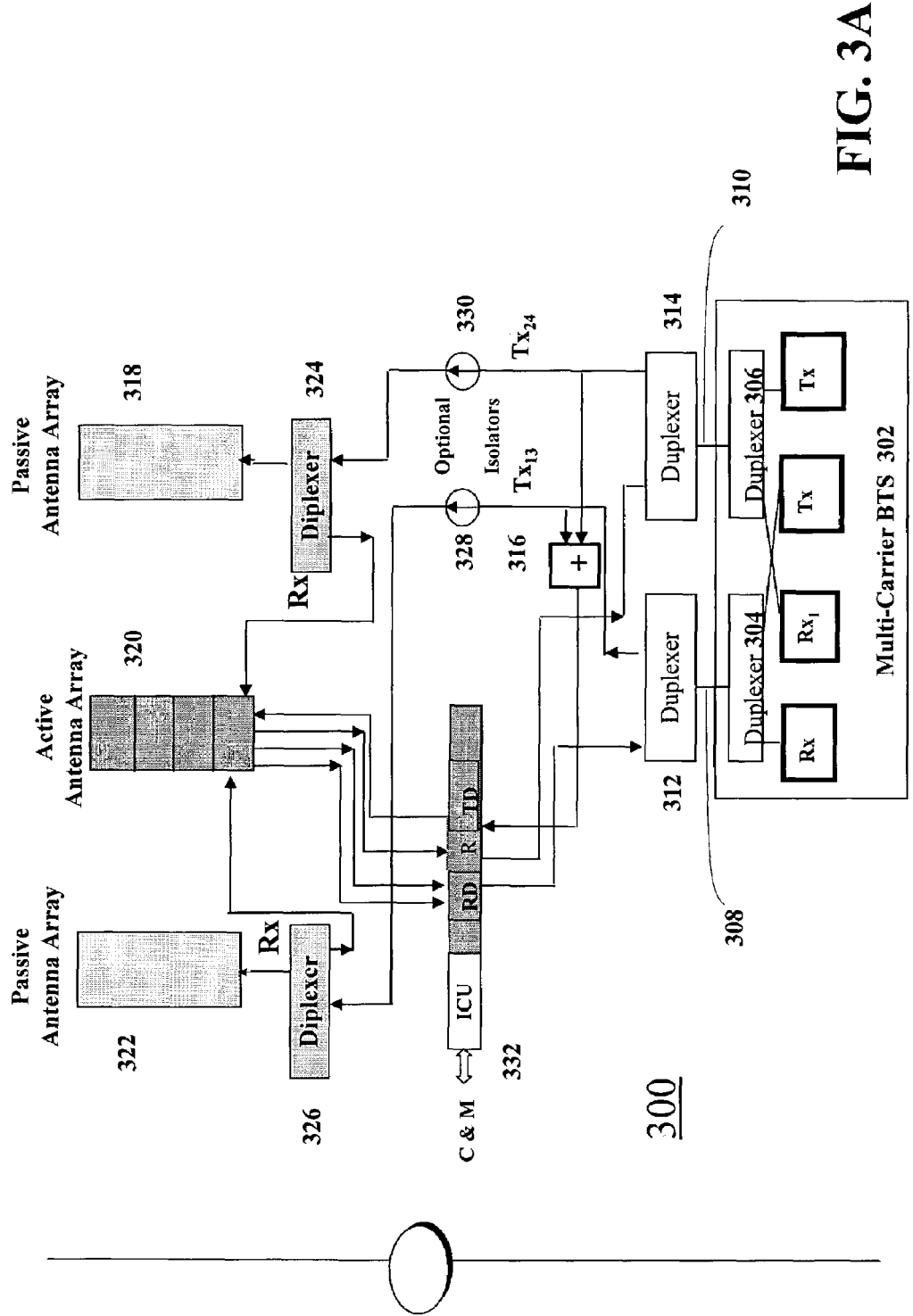
FIG. 3A is a block diagram of a base station 300 that supports multicarrier operation.

As described above, the time delay transmit diversity scheme of the present invention may be applied to an existing multicarrier BTS to enhance both forward and reverse link signal quality in a tower-top passive antenna configuration, as illustrated in FIG. 2A, or for an active antenna configuration, as illustrated in FIG. 3A.

FIG. 3A illustrates a MC BS 300 in accordance with another embodiment of the inventions. Much like the first embodiment of MC BS 200, BS 300, capable of MC operations, may be configured with a supplemental antenna and a delay mechanism to provide transmit delay diversity on the forward link via the 3-antenna configuration. The 3-antenna configuration may also exploit shared components to achieve greater reverse link sensitivity. The factors concerning the location of the active antenna array 320 with respect to passive antennas 322, 318 are similar to those discussed above with regard to placement of the passive antenna arrangement 220 with respect to passive antennas 218 and 222.

As indicated in FIG. 3A, BS 300 incorporates a supplemental antenna arrangement such as active antenna array 320 in addition to the two conventional passive antennas 318, 322. Supplemental antenna arrangement 320 may be configured as an active antenna array, as shown, but does not necessarily have to be so configured. Active antenna array 320 receives time-delayed replicas of the original transmit signals generated by MC BTS 302. Also, passive antennas 318, 322 radiate the original transmit signals. Thus, active antenna array 320 provides a transmit diversity path for passive antennas 318 and 322. Further, the combination of the time-delayed and original transmit signals due to the use of active antenna array 320 enhances the forward link at the MSs for all the carriers of the BTS, and enhances the reverse link by providing pre-amplification to all the antennas with additional delay processing performed at ICU 332 that effectively modifies the receive path for three-branch diversity reception.

Figure 3C:
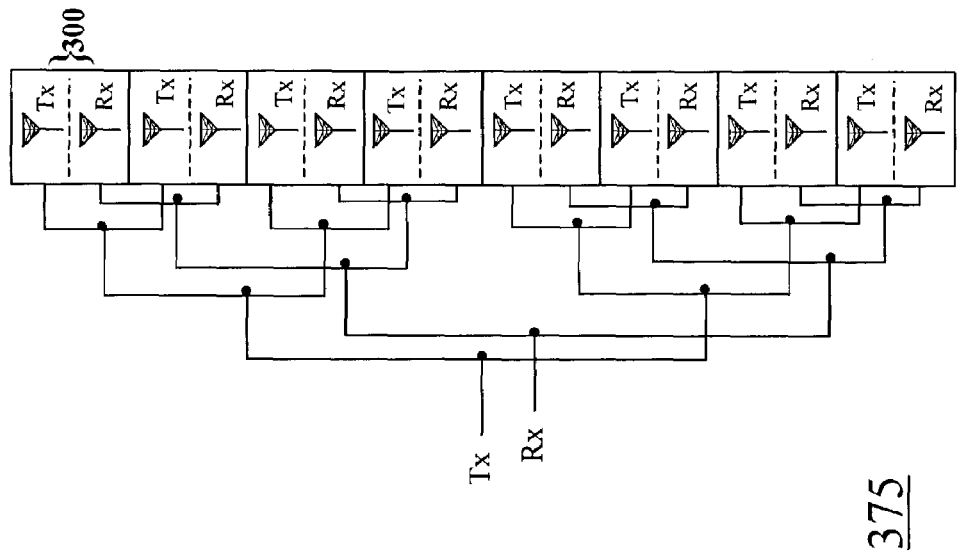
FIG. 3C shows an active antenna arrangement 375.
Figure 3B:
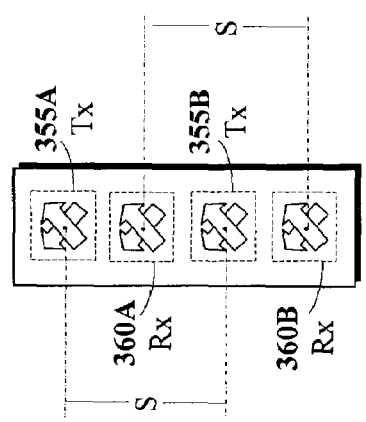
FIG. 3B depicts an active antenna array arrangement 350.

FIG. 3B depicts an example of an active antenna array arrangement. As depicted in FIG. 3B, antenna array 350 comprises a combination of two active transmit antenna elements 355A, 355B and two active receive antenna elements 360A, 360B, arranged in a single vertical (columnar) array. The two active transmit antenna elements 355A, 355B and two active receive antenna elements 360A, 360B, are preferably printed elemental radiators having a multi-layer configuration & sealed by an epoxy-fiberglass radome. By incorporating separate transmit antenna elements 355A, 355B and receive antenna elements 360A, 360B within a single array, the BS is capable of achieving full transmission and reception functionality for wireless operations while eliminating the need for independent transmission and reception antenna arrays. In doing so, antenna array 350 achieves full BS antenna array functionality.

Moreover, the transmit and receive elements are spatially separated to avoid intermodulation effects as well as allowing for flexibility in BS transmission and reception optimization schemes, such as, for example, independent gain control and beam-shaping.

FIG. 3B further illustrates that, within the vertical arrangement, the antenna elements are disposed in an alternating fashion such that a first transmit antenna element 355A is followed by a first receive antenna element 360A and a second transmit antenna element 355B is followed by a second receive antenna element 360B. The interleaving of the transmit 355A, 355B and receive antenna elements 360A, 360B within the array enables the optimal vertical separation distance S to be established. Optimal vertical separation distance S is the vertical distance between like antenna elements which, for a given frequency, maximizes the main lobe gain of a signal while minimizing the contribution of minor lobes. The optimal vertical separation distance S can vary. For example, in PCS arrays, S may be from $0.70\lambda$ to $0.95\lambda$.

The specific arrangement of antenna array 350 may be modified to provide redundancy or otherwise enhance the attributes and characteristics of the array configuration. For example, antenna array 350 may be augmented by stacking combinations of the array elements to achieve antenna elements arranged in an 8×1, 12×1, or 16×1 array configuration, as illustrated in FIG. 3C.

Returning to FIG. 3A, MC BS 300 combines the carriers generated by BTS 302 in the forward link or transmit direction. This may be achieved by combining, for example, carriers 1 and 3 into the transmit chain terminating with passive antenna 322, and carriers 2 and 4 into the transmit chain terminating with passive antenna 318. Each of the two combined transmit signals, $Tx_{13}$ and $Tx_{24}$, may pass through internal duplexers 304, 306 or external duplexers 312, 314 respectively, with one of the two Rx signals. Thus, the BTS 302 has two input/output (I/0) ports 308, 310 with each supporting Tx/Rx functionality.

The signal from ports 308 and 310 may generally be a high-power MC composite signal that is passed through an external duplexer 312, 314 to separate the transmit and receive signals. External duplexers 312 and 314 may optionally be eliminated if Internal duplexers 304 and 306 are not utilized. The transmit signals from ports 308, 310 are sampled via a directional coupling and combining mechanism 316 and combined at low power to yield a composite multicarrier low-power signal. The directional coupling and combining mechanism 316 may have a value, for example, of 30 dB. The high-power original transmit signals from the external duplexers 312 and 314 are routed to passive antennas 318 and 322. Prior to entering passive antennas 318 and 322, the high-power original transmit signals pass through a pair of tower top diplexers 324 and 326 respectively. Tower top diplexers 324 and 326 separate the transmit and receive signals per passive antenna 318 and 322.

A transmit isolator 328 and 330 may optionally be included as a part of the transmit signal flow from external duplexers 312 and 314. Passive antennas 318 and 322 may suffer reverse injection from a nearby strong interference that may couple into the antenna and flow backwards through the tower top diplexers 326 and 324, the long transmit cabling, and the directional coupling mechanism 316 (through the directivity defining the isolation between its output and the coupled port) that joins the coupled transmit signal from the multicarrier BTS and the duplexers 312 and 314.

As an example of the use of transmit isolators 328 and 330 in an embodiment of the present invention, assume −20 dBm interference at passive antenna ports 322 and 318, attenuated backwards through the tower-top duplexers 326 and 324 and cabling by 10 dB, and assume a directivity of 40 dB. This provides an interference level of −70 dBm at the transmit coupled port where the desired transmit signal may appear as 0 dBm (or higher). Thus, in this example, the undesired interference will be 70 dBm below the desired transmit signal, which may be well below the regulatory limits for spurious transmit signals. Nevertheless, as a precaution, the inclusion of an isolator in each transmit path that leads into passive antennas 318, 322, further attenuates any uncontrolled strong interference e.g., from a BS belonging to a different mobile network that may appear as a reverse injection signal into the transmit path.

The combined low-power composite multicarrier transmit signal from the directional coupling mechanism 316 is passed into an interface and control unit (ICU) 332. The ICU 332 delays the composite multicarrier transmit signal by, for example, approximately 2 microseconds. The delayed signal is then pre-amplified by a transmit active bias t-connector (TxABT) board contained within the ICU 332. ICU 332 may include, for example, slots labeled RD, R and TD. RD includes, for example, two receive active bias t-connectors (RxABTs), a receive surface acoustic wave (Rx SAW) delay, and a combiner. TD includes, for example, a TxABT and a transmit surface acoustic wave delay (Tx SAW). From the ICU 332 TD slot, the delayed and pre-amplified transmit signal is fed to active antenna array 320. Thus, the signal at active antenna array 320 is transmitted as a delayed version of the transmit signals transmitted from each of passive antennas 318 and 322.

For the Rx signals, each of the two passive antenna array ports may be fed through tower-top diplexers 326 and 324. The two Rx signals from passive antennas 318 and 322 may be fed into the active antenna array 320 auxiliary Rx inputs, and are pre-amplified by dedicated low-noise amplifiers (LNAs) that are a part of the active antenna array 320 configuration. This greatly enhances the effective noise-figure (NF) of the Rx paths from passive antennas 318, 322, and allows the use of thin, low-cost RF cabling from active antenna array 320 down to ICU 332 and the MC BTS 302. In addition to the two Rx signals from passive antennas 318 and 322, active antenna array 320 provides an additional Rx signal that is also pre-amplified by a LNA. Thus, there are three independent Rx signals fed from the two passive 322, 318 and one active antenna 320 arrays. Each of the three Rx signals are pre-amplified and fed into the ICU 332, where they are conditioned by a receive active bias t-connector (RxABT) board, employing a total of 3 slots.

As indicated in FIG. 3A, the three signals fed into ICU 332 enter slots RD and R. Two of the three Rx signals are combined. A predetermined delay of, for example, approximately 2 microseconds, is introduced to one of the two combined Rx signals prior to being combined with the second Rx signal. Thus, the RD slot contains, for example, the combination of one Rx Delay unit, two RxABT units, and a 2:1 Rx combiner unit.

As a result of this implementation of the present embodiment, ICU 332 outputs two Rx signals to the two ports of the MC BTS, thereby creating 3-branch diversity reception. The Rx output signals from ICU 332 are first fed to duplexers 312, 314 prior to passing into the MC BTS 302. MC BTS 302 serves those two Rx signals and performs optimal Rx diversity processing for all carriers involved.

The embodiment of the present invention as illustrated in FIG. 3A enhances the overall system performance of both the forward and reverse links while utilizing the high-power transmit function of the MC BTS 302 without removing or deactivating any parts of the two existing passive antennas 318, 322 supported by the MC BTS 302.

While the invention has been described with reference to the certain illustrated embodiments, the words that have been used herein are words of description, rather than words or limitation. Changes may be made, within the purview of the appended claims, without departing from the scope and spirit of the invention in its aspects. Although the invention has been described herein with reference particular structures, acts, and materials, the invention is not to be limited to the particulars disclosed, but rather extends to all equivalent structures, acts, and materials, such as are within the scope of the appended claims.

What is claimed is:

1. A base station system for implementing forward link delay diversity in a multicarrier wireless communication system, comprising:
    a base station transceiver system configured to generate multicarrier transmit signals;
    a directional coupling mechanism configured to sample and combine the multicarrier transmit signals from said base station transceiver system to produce a composite multicarrier transmit signal;
    a delay mechanism configured to introduce a predetermined delay into the composite multicarrier transmit signal; and
    a plurality of antenna arrangements,
    wherein the plurality of antenna arrangements includes at least two antenna arrangements that radiate the multicarrier transmit signals generated by said base station transceiver system and at least one antenna arrangement that radiates the delayed composite multicarrier transmit signal in order to provide forward link delay diversity.

2. The system of claim 1, further comprising a plurality of duplexing units configured to receive and transmit the generated multicarrier transmit signals.

3. The system of claim 2, wherein said plurality of duplexing units includes a set of duplexers located within the base transceiver system.

4. The system of claim 1, wherein the at least two antenna arrangements that radiate the multicarrier transmit signals generated by said base station transceiver system are passive antenna arrays.

5. The system of claim 1, wherein at least one isolator unit is configured between the transmit path between the base station transceiver system and the at least two antenna arrangements that radiate the multicarrier transmit signals generated by said base station transceiver system.

6. The system of claim 1, wherein the at least one antenna arrangement that radiates the delayed composite multicarrier transmit signal is a passive antenna array.

7. The system of claim 6, further comprising:
    an amplification unit configured to amplify the delayed composite multicarrier transmit signal from the delay mechanism; and
    a plurality of low noise amplifiers located adjacent the plurality of antenna arrangements and configured to amplify the multicarrier transmit signals generated by the base station transceiver and the amplified signal from the amplification unit.

8. The system of claim 7, wherein the amplification unit is a high power amplifier located adjacent to the base station transceiver system.

9. The system of claim 6, wherein the amplification unit is a high power amplifier located in one of the tower base and tower top.

10. The system of claim 1, wherein the at least one antenna arrangement that radiates the delayed composite multicarrier transmit signal is an active antenna array having beam shaping capabilities.

11. The system of claim 10, further comprising a control unit configured to monitor and control signals from the directional coupling mechanism and the active antenna array.

12. The system of claim 2, wherein the plurality of duplexing units further comprises a set of duplexers located adjacent the at least two antenna arrangements that radiate the multicarrier transmit signals.

13. The system of claim 11, wherein the control unit comprises:
    a first receive portion configured to receive a single receive signal input from the active antenna array; and
    a second receive portion configured to receive at least two receive signal inputs from the active antenna array, wherein the second receive portion includes a mechanism that implements a delay to one of the at least two receive signal inputs, a combining unit configured to combine the delayed receive input and the remaining receive signal inputs, and a mechanism configured to amplify the signals from the combining unit to produce a single output receive signal from the second receive portion.

14. The system of claim 13, wherein the implemented delay is 2 microseconds.

15. A method of implementing forward link delay diversity in a multicarrier wireless communication system, comprising:
    supplementing a plurality of antenna arrangements of a base station transceiver system with an auxiliary antenna array;
    generating multicarrier transmit signals at the base station transceiver system;
    combining the multicarrier transmit signals from the base station transceiver system to produce a composite multicarrier transmit signal; and
    implementing a predetermined delay to the composite multicarrier transmit signal to produce a delayed composite high-power transmit signal, wherein the plurality of antenna arrangements includes at least two antenna arrangements that radiate the multicarrier transmit signals generated by the base station transceiver system and at least one antenna arrangement that radiates the delayed composite multicarrier transmit signal in order to provide forward link delay diversity.

16. The method of claim 15, wherein the at least two antenna arrangements that radiate the multicarrier transmit signals generated by the base station transceiver system are passive antenna arrays.

17. The method of claim 15, further including isolating a reverse rejection signal between the transmit signal path between the base station transceiver system and the at least two antenna arrangements that radiate the multicarrier transmit signals generated by the base station transceiver system.

18. The method of claim 15, wherein the at least one antenna arrangement that radiates the delayed composite multicarrier transmit signal is a passive antenna array.

19. The method of claim 18, further comprising:
amplifying the delayed composite multicarrier transmit signal; and
amplifying the multicarrier transmit signals generated by the base station transceiver system.

20. The method of claim 19, wherein a high power amplifier amplifies the delayed composite multicarrier transmit signal.

21. The method of claim 15, wherein the at least one antenna arrangement that radiates the delayed composite multicarrier transmit signal is an active antenna array having beam shaping capabilities.

22. The method of claim 21, further comprising:
receiving signals at the active antenna array from the passive antenna arrays; and
sending at least three receive signals from the active antenna array to portions of a control unit.

23. The method of claim 22, further comprising:
receiving a single receive input from the active antenna array at a first receive portion of the control unit; and
receiving at least two receive signal inputs from the active antenna array at a second receive portion, wherein the second receive portion further comprises:
implementing a delay to one of the at least two receive signal inputs from the active antenna array to produce a delay receive signal;
combining the delayed receive signal and the remaining receive signal input; and
amplifying the combined signal to produce a single receive output signal from the second receive portion.

* * * * *